United States Patent

[11] 3,555,989

| [72] | Inventor | Loren E. Shelffo |
| --- | --- | --- |
| | | Palatine, Ill. |
| [21] | Appl. No. | 869,986 |
| [22] | Filed | Sept. 2, 1969 |
| | | Division of Ser. No. 566,164, July 18, 1966, Patent No. 3,490,908. |
| [45] | Patented | Jan. 19, 1971 |
| [73] | Assignee | Addressograph-Multigraph Corporation Mount Prospect, Ill. a corporation of Delaware |

[54] DIAZOTYPE DEVELOPER MATERIALS AND THE PRODUCTION AND USE THEREOF
4 Claims, 4 Drawing Figs.

[52] U.S. Cl. ..................................... 95/89, 96/49; 355/27
[51] Int. Cl. ........................................ G03d 3/00
[50] Field of Search ............................. 95/89, 89R, 89(Gas Digest); 355/27; 96/49(Inquired); 117/(Inquired)

[56] References Cited
FOREIGN PATENTS
968,869  9/1964  Great Britain ................  95/89(R)

*Primary Examiner*—John M. Horan
*Assistant Examiner*—Alan Mathews
*Attorney*—Sol L. Goldstein ABSTRACT: A liquid-carrying roller useful for applying controlled amounts of a diazo-developing liquid which is released in response to removal of the liquid from the surface of the roller. The roller is made of a porous solid resin such as polyethylene. The pores have an average diameter from 10 to 75 microns and contain an organic amine having a boiling point in the range from 105° to 250° and a pK value less than 4.70.

PATENTED JAN 19 1971

Inventor:
Loren E. Shelffo

By: Sol L. Goldstein
Atty.

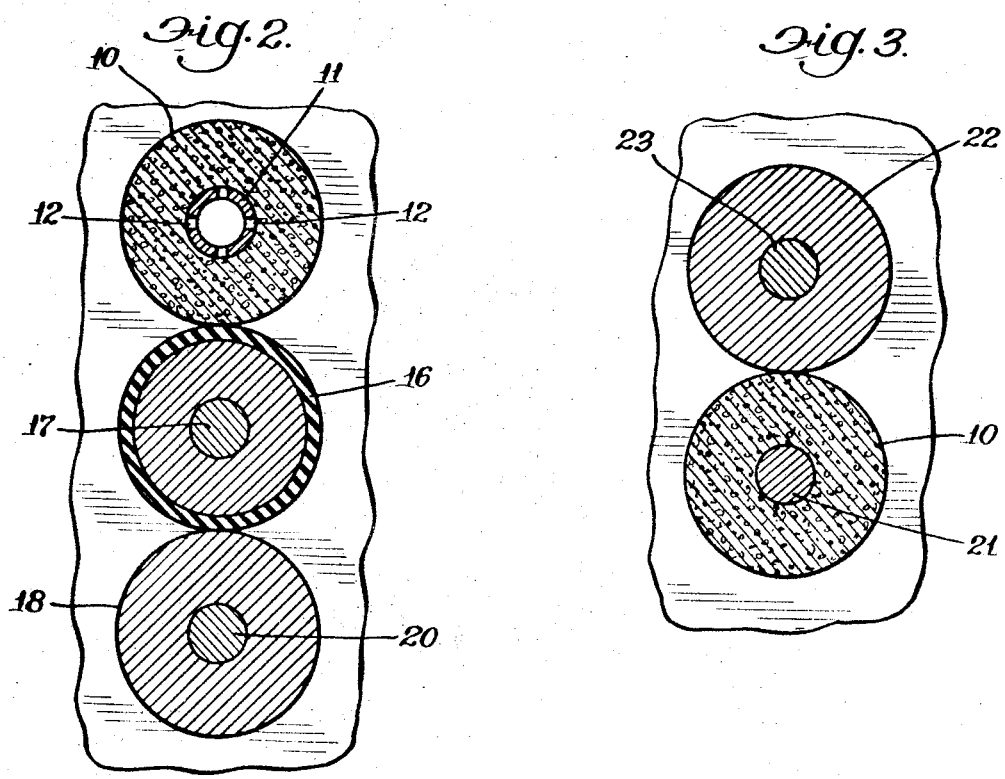
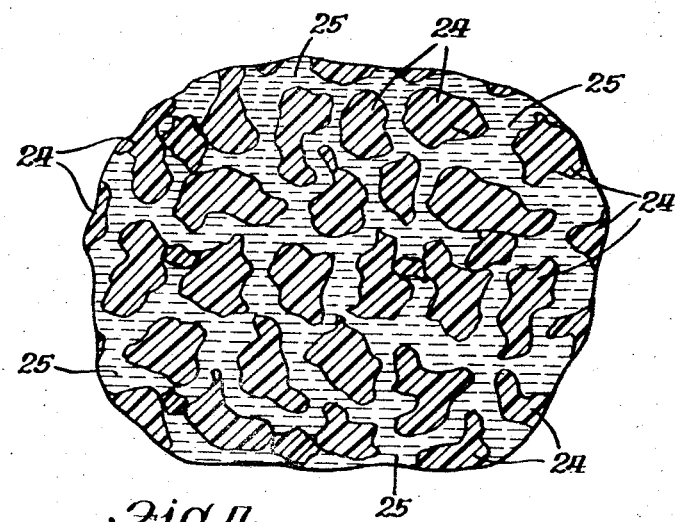

DIAZOTYPE DEVELOPER MATERIALS AND THE PRODUCTION AND USE THEREOF

This application is a division of copending application Ser. No. 566,164, filed Jul. 18, 1966, Loren E. Shelffo, now U.S. Pat. No. 3,490,908, and assigned to the same assignee as the instant application.

This invention relates to a method of developing two-component diazo-type materials and developer materials which are useful in such methods. More particularly, this invention relates to a porous plastic flexible solid material containing a nonvolatile amine in the pores thereof for developing two-component diazo-type materials.

Two-component diazo-type materials are sheet materials, usually paper, which are coated with a light-sensitive organic diazonium salt and an organic coupling component. The organic diazonium salt is usually in the form of a zinc chloride double salt which is stable under ordinary conditions but which decomposes when exposed to light. The organic coupling component is usually a phenolic material which will react with the diazonium salt at proper pH conditions to form an azo dye. Such two-component diazo-type materials are commonly used for photographic and photocopying processes by exposure to light under a master whereby the diazonium salt is decomposed in the light-struck areas. Exposure thus forms a latent image of diazonium compound corresponding to the image on the master sheet. This latent image is developed by treatment of the exposed diazo-type sheet with a basic substance which raises the pH of the coating containing the diazonium salt and the organic coupling component to a range where reaction between the diazonium salt and the coupling component takes place with the formation of an azo dye, thus producing a colored image corresponding to the latent image.

Two-component diazo-type materials of the type described above are commonly developed with ammonia. The ammonia increases the pH to the range from eight to 10 in which the coupling reaction occurs with the formation of the colored image. Ammonia, while cheap and readily available, has the great disadvantage of giving off noxious fumes which are undesirable. Ordinarily, when ammonia is used as the developing agent for a diazo-type material, the development has to be carried out in a closed system equipped with a fume hood to prevent the ammonia fumes from contaminating the atmosphere of the room in which the operation takes place.

It is an object of this invention to provide improved developers for diazo-type materials and processes for developing diazo-type materials. A further object is to provide simple and economical developing equipment for diazo-type materials. These and other objects are apparent from and are achieved in accordance with the following disclosure.

We have discovered that nonvolatile organic amines such an ethanolamine and other organic amines having boiling points greater than about 105° C. and having a pK value less than 4.70 are suitable developing agents for two-component diazo-type materials which do not produce undesirable fumes. The pK value as used herein refers to —log K (dissociation constant). We have also discovered that three-dimensional objects of porous resins containing such organic amines in the pores thereof are particularly desirable as developing materials for two-component diazo-type materials. These solid resinous materials are used in the form of rollers which, when applied to the surface of an exposed sheet of two-component diazo-type material, exude the organic amine in a thin film which covers the sheet of diazo-type material and causes the diazonium salt to react with the organic coupling component and form a colored image corresponding to the latent image of undecomposed diazonium salt.

Our invention is more readily understood by reference to the attached drawings where:

FIG. 2 is a cross section of the arrangement illustrated in FIG. 1 taken along 2-2 showing the porous resin-amine roller with a transfer roller and a backup roller;

FIG. 3 illustrates the combination of the porous resin-amine roller with the backup roller; and FIG. 4 is a greatly enlarged diagrammatic view of the section of the roll in FIG. 2 of the porous resin containing the organic amine in the pores or interstices thereof.

Figure 1:
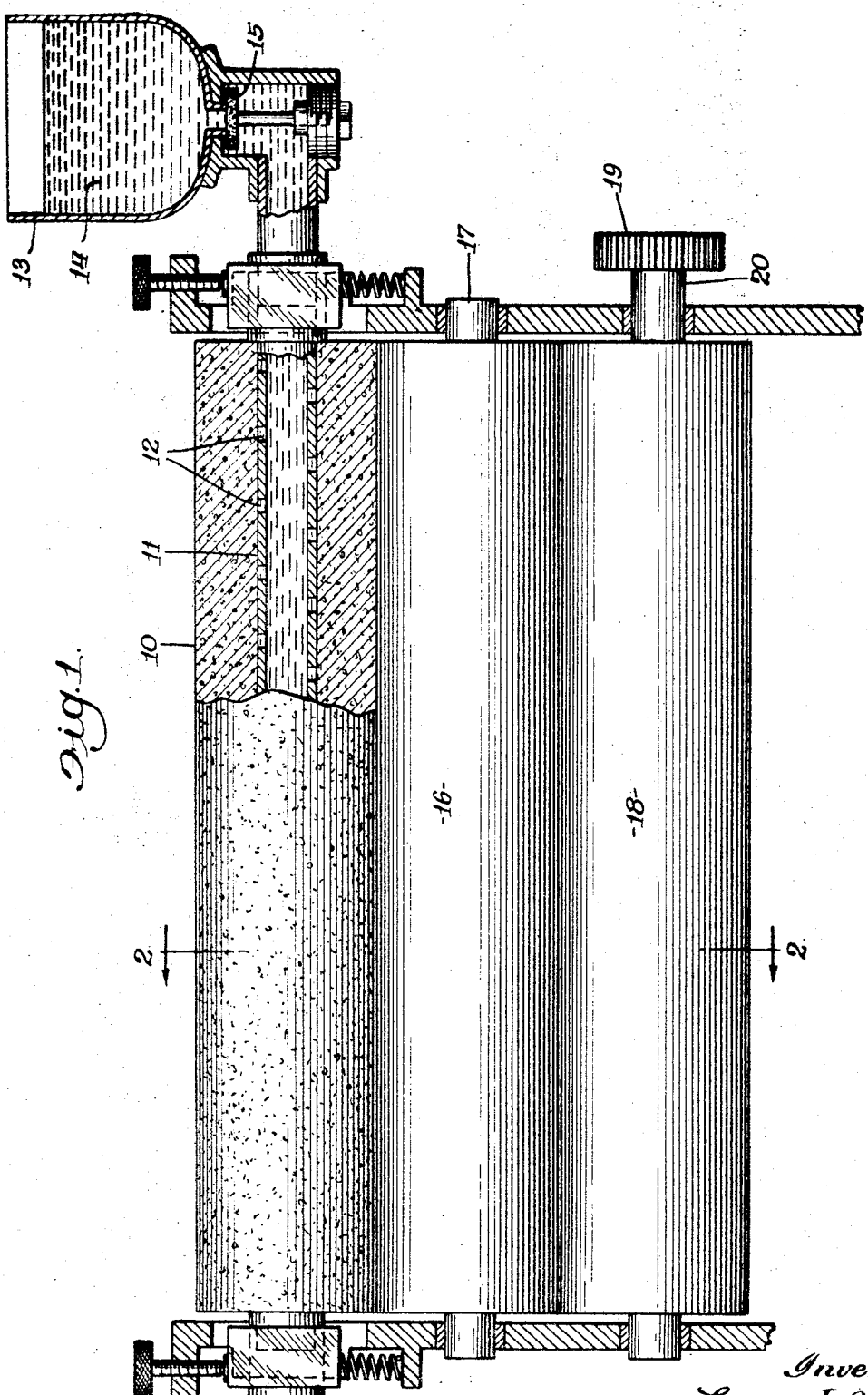
FIG. 1 illustrates a roller of flexible porous plastic material containing the organic amine in the pores thereof in combination with a rubber transfer roller and a metal backup roller.

The resin components of the porous resin-amine combination can be any of the thermoplastic resins which soften in the range from 200°—400° F. and which are insoluble in the organic amine. The preferred resin is polyethylene although other resins can be used such as vinyl resins, styrene resins, nylon resins and the like. These resins are used in fine particle size, in the range from 5 to 50 microns, preferably 20 to 35 microns. The average of the largest pore dimension is 10 to 70 microns.

The three-dimensional-shaped objects of resin and organic amine are produced by thoroughly mixing the one part by weight of the finely divided resin particles with one part to five parts by weight of the organic amine and solvent, if any. The mixture is then placed in a mold and heated at a temperature range sufficiently great to soften the resin particles without melting them. The resin particles are thus fused together to form a porous solid with the organic amine or combination of organic amine and solvent dispersed throughout the pores or interstices of the solid. The solid material is then chilled, removed from the mold and cut or machined into the desired shape.

When polyethylene constitutes the resin and ethanolamine constitutes the organic amine, it has been found that heating the mixture thereof at a temperature from 230°—235° F. for 10 to 15 minutes will produce a suitable porous solid material. When other organic resins are used, higher temperatures may be required to soften the resin particles and fuse them together in a porous solid; for example with polyvinylchloride resin temperatures in the range of 300°—350° F. for periods of time from 10 to 30 minutes may be required. Other organic amines which are suitable for use in this invention include benzylamine, diethanolamine, dimethylaminoethanol, cyclohexylamine, piperidine, morpholine and similar amines boiling between 105° C. and 250° C. and having a pK value less than 4.70 at 20° C. If desired, high-boiling solvents such as a glycol, a glycol ether or a glycol ester of b.p. 150°—250° C. can be added.

The preferred shape of the porous resin solid containing the organic amine in the pores thereof is a resilient hollow cylinder. This can be produced by molding the material in an annular space or can also be accomplished by molding the materials in a hollow cylinder and then machining out a cylindrical space in the center of the resulting cylindrical resin shape.

FIG. 1 illustrates a preferred embodiment of the invention. There is a hollow roller 10 made of resilient porous polyethylene containing ethanolamine in the pores thereof is fitted on a hollow shaft 11 containing holes 12 through which ethanolamine or a solution of ethanolamine in a solvent may be passed. One end of the hollow shaft is attached to a reservoir 13 containing the amine-solvent mixture 14 which is fed by gravity through a valve system 15 into the hollow shaft 11. The amine-solvent combination passes through the holes 12 into the porous roller 10 and replenishes the amine-solvent combination in the pores of the roller 10 as this combination is exuded in the operation of the roller.

Arranged parallel with the porous roller 10 is a resilient rubber roller 16 which is pressed gently on the porous roller by springs (not shown). The rubber roller 16 on a shaft 17 is parallel and adjacent to a metal roller backup 18 which is driven by a power source (not shown) through the gear 19 attached to the shaft 20 to which the roller 18 is affixed. As the roller 18 is rotated, it causes the rubber roller 16 to rotate which in turn causes the porous roller 10 to rotate. The rotation of the rollers causes the amine-solvent combination in the pores of the roller 10 to coat the rubber roller 16. Diazo-type sheet material, after exposure, is passed between the rubber roller 16 and the metal backup roller 18 with the diazo-type coating in contact with the rubber roller The latter applies a thin film of amine to the surface of the diazo-type material, thus bringing about development of the latent image to a visible image of azo dye formed by the reaction of the diazonium compound with the coupling component.

The porous resin roller 10, although flexible, can be deformed by a hard object or even a fold or crease in a copy sheet which may come in contact with it. Dents or marks so created in the roller produce a pattern on the diazo-type print. For this reason it is usually desirable to use an intermediate resilient roller 16 which transfers the developer from the porous roller 10 to the copy sheet. The developer fluid is transferred to the intermediate roller 16 as thin, uniform film and applied therefrom the diazo-type copy sheet without any pattern.

The amount of developer fluid applied to the diazo-type sheet is usually in the range from 0.5 to 5 grams of amine per square meter. With most diazo-type materials 1 to 3 g./sq.m. is sufficient. The amount applied to the sheet can be controlled by adjusting the pressure between the rolls by springs, thumbscrews or a weight roll.

FIG. 2 shows in more detail the arrangement of the three rollers of FIG. 1, the porous resin roller 10 being in contact with the rubber roller 16 and the latter in contact with the metal backup roller 18. The rollers are spring biased so that a slight pressure is maintained between all of them. The sheet of diazo-type material is ordinarily fed between the rollers 16 and 18 by a conventional sheet-feeding mechanism (not shown).

FIG. 3 represents a simplified embodiment of the apparatus shown in FIGS. 1 and 2. In FIG. 3 a porous resin-amine roller 10 is mounted on a solid shaft 21 and contains the amine-solvent combination in the pores thereof. This roller is in pressure contact with a metal backup roller 22 mounted on a shaft 23. Both shafts 21 and 23 are mounted in a suitable housing (not shown) with spring bias to create gentle pressure between them. A sheet of exposed diazo-type material is fed between the rollers 10 and 22 with the diazo-type coating in contact with the roller 10, which exudes a thin film of amine over the sheet.

FIG. 4 is a cross-sectional view of the porous plastic solid showing particles of the resin 24 with interstices 25 between these particles forming pores which retain the organic amine or amine-solvent combination.

A porous roller 1½ to 2 inches in diameter contains sufficient amine for developing 400—600 diazo-type sheets of letter size. With a reservoir system as shown in FIG. 1, 10,000 prints may be obtained from a quart of amine when applied at a rate of 1 to 2 g./sq.m.

Porous rolls of the type described herein with nonvolatile organic amines in the pores thereof have several advantages over other developers for diazo-type materials The developing machines are cheaper and less cumbersome. No liquids or gases are required. The developer can be renewed by the simple step of replacing the roller. By use of a reservoir system, it is possible to make thousands of copies without stopping the machine.

Our invention is disclosed in further detail by means of the following examples which are provided for purposes of illustration only and are not to be construed as limiting the invention to the materials or conditions described therein. It will be understood by those skilled in the art that equivalent materials and conditions may be adopted without departing from the invention as herein described.

EXAMPLE 1

Finely divided polyethylene resin particles of average size approximately 50 microns were admixed with an equal weight of monoethanolamine. The mixture was thoroughly agitated to disperse the resin particles uniformly throughout the amine. It was then fed into a closed cylindrical mold which was heated to a temperature of 232° F. and maintained at that temperature for 12 minutes. The mold was then opened and the cylinder of porous solid, flexible polyethylene containing the amine was removed, an axial hole bored therein and a hollow metal shaft containing numerous small holes was inserted therein. This roller and hollow shaft was mounted in a device as illustrated in FIG. 1 and used for developing two-component diazo-type materials.

EXAMPLE 2

A mixture of 400 parts by weight of Microthene 680 (polyethylene powder of average particle size 35 microns, U.S. Industrial Chemicals, Inc.) and 1,000 parts by weight of dicyclohexylamine was heated for 15 minutes at 232° F. in a pressurized annular mold having a large diameter of 1½ inches and a small diameter of three-eights inch and a length of 15 inches. The mold was chilled and the hollow cylinder of solid porous resin containing the ethanolamine in the pores thereof was removed from the mold. It was mounted on a hollow perforated shaft suitable for engagement in an apparatus of the type disclosed in FIG. 1.

EXAMPLE 3

One hundred parts of polyvinyl chloride particles (average size 25 microns) and 200 parts of 2-dimethylaminoethanol were thoroughly mixed and poured into a cylindrical mold, 1-½ inches in diameter and 14 inches long. The mold was jacketed with hot Dowtherm at 300°—310° F. After 15 minutes the mold was opened and the cylindrical porous solid of polyvinyl chloride containing the amine in its pores was removed and fitted on a hollow shaft with multiple perforations therein. The roller so produced was suitable for developing two-component diazo-type paper.

EXAMPLE 4

One hundred parts of polyethylene particles (Microthene 680), 250 parts of diethylene glycol and 250 parts of ethanolamine were mixed thoroughly and poured into a cylindrical mold. The mold was kept at 235° F. for 15 minutes. The solid porous cylinder of polyethylene with the amine-solvent combination in the pores was usable as a developer for diazo-type materials.

EXAMPLE 5

A mixture of 400 parts of polyethylene particles (Microthene 620) and 1,000 parts of hexylene glycol was placed in a cylindrical mold and heated to 232° F. for 20 minutes. On cooling, the cylinder of porous polyethylene was removed and bored with an axial hole. Hot water (140—150° F.) under slight pressure was forced into the hollow polyethylene roll while one end was closed. The hot water was forced out through the pores of the polyethylene, thus flushing out the hexylene glycol. The roll was then dried by forcing warm air through it. This roll can be mounted on a perforated hollow shaft, as shown in FIG. 1, and a nonvolatile amine fed to it from a reservoir. The amine rapidly fills the pores of the polyethylene and can be applied to sheets from the roll.

I claim:

1. A solid resilient porous resin applicator for developing two-component diazo-type materials comprising a porous solid of sintered resin particles defining liquid-carrying pores between such particles, said pores having an average diameter from 10 to 75 microns and extending from one surface of the porous solid to the opposite surface, said pores containing an organic amine having a boiling point in the range from 105° to 250° C. and a pK value less than 4.70 whereby the liquid supply at the outside surface of the applicator is renewed as said diazo-type materials are developed.

2. A porous solid resin object as defined by claim 1 wherein the resin is polyethylene.

3. A porous solid resin object as defined by claim 2 wherein the organic amine is an ethanolamine.

4. A porous solid resin object as defined by claim 3 wherein the weight of the amine is in the range from 100 percent to 500 percent of the weight of the resin.